C. H. Beeman.
Potato-Baker.
Nº 74282.  Patented Feb. 11, 1868.
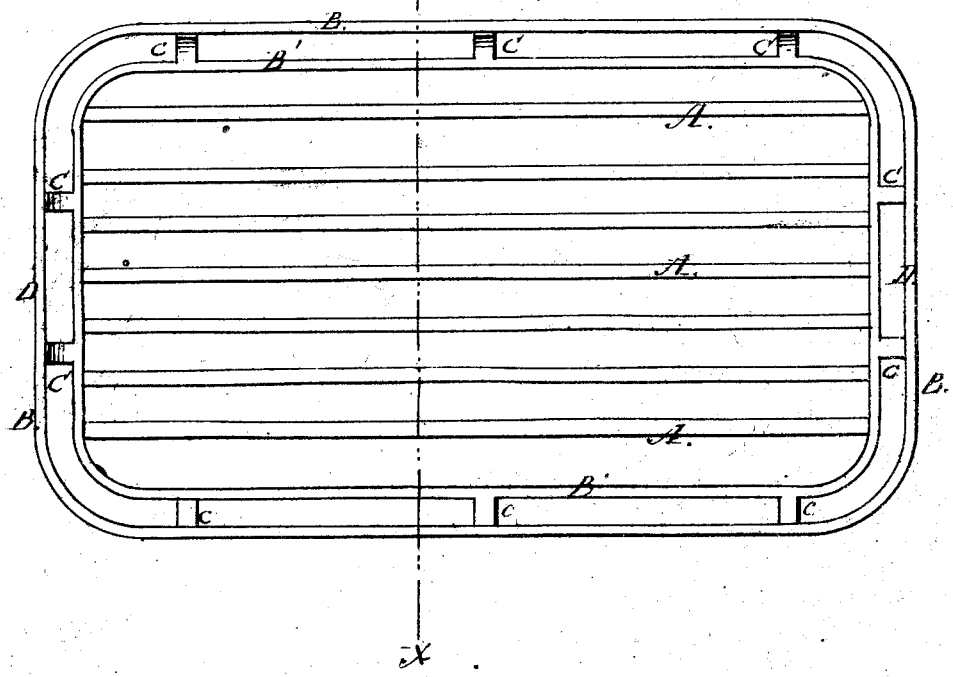
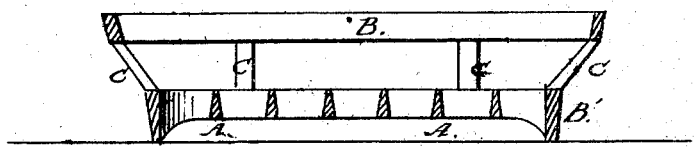

United States Patent Office.

CHARLES H. BEEMAN, 2D, OF NORTH FAIRFAX, VERMONT

Letters Patent No. 74,282, dated February 11, 1868.

POTATO-BAKER.

The Schedule referred to in these Letters Patent and making part of the same.

TO ALL WHOM IT MAY CONCERN:

Be it known that I, CHARLES H. BEEMAN, 2d, of North Fairfax, in the county of Franklin, and State of Vermont, have invented a new and useful Improvement in Potato-Baker; and I do hereby declare that the following is a full, clear, and exact description thereof, which will enable those skilled in the art to make and use the same, reference being had to the accompanying drawings, forming part of this specification.

This invention relates to a new and improved method of baking potatoes, or handling them during the process of baking, and it consists in providing a grated iron griddle or basket for the same, whereby the potatoes are much more easily handled and much more evenly and perfectly cooked than when they are thrown on to the oven-bottom, or laid in a tight-bottomed vessel, as is usual.

Figure 1 represents a top view of the basket, which is cast of iron in one piece.

Figure 2 is a cross-section through the line $x\ x$ of fig. 1.

Similar letters of reference indicate corresponding parts.

The grates upon which the potatoes are placed are made thin at the upper edge, as seen in the sectional drawing, so that the surface of the potato shall not come in contact with a broad surface of iron and thereby be burned.

A represents these grates or bars. B B' are the upper and the lower rims. C represents the stands which connect B B', and which raise the upper rim B sufficiently to keep the potatoes in the basket. The grates A are raised from the bottom, in consequence of their being narrower than the sides of the lower rim, as seen in the drawing.

In using the article for the purpose intended, the potatoes are placed in it, and the basket may be shaken when they are partially cooked, by which the desired change is made in their positions, and when they are sufficiently baked, the basket, with the potatoes, is withdrawn from the oven.

D D, at each end of the basket, represent handles, by which the basket is withdrawn or handled.

It will be seen that the heat has a free circulation through the bottom and sides of the basket, so that the baking is complete and uniform throughout.

Having thus described my invention, I claim as new, and desire to secure by Letters Patent—

As a new article of manufacture, a potato-baker, constructed as described, consisting of the upper and lower rims B B', connected by inclined stands C, the longitudinal grate-bars A, surrounded by the rim B', all arranged and operating as described, for the purpose specified.

CHARLES H. BEEMAN, 2D.

Witnesses:
W. A. SHUMWAY,
GEO. W. BROWN.